March 26, 1957  F. C. POVLICH  2,786,701
AUTOMOBILE DOOR SAFETY LOCK

Filed Sept. 22, 1953  2 Sheets-Sheet 1

INVENTOR
FREDERICK C. POVLICH.

BY *Gustave Miller*
ATTORNEY

United States Patent Office 2,786,701
Patented Mar. 26, 1957

2,786,701

AUTOMOBILE DOOR SAFETY LOCK

Frederick C. Povlich, Ecorse, Mich.

Application September 22, 1953, Serial No. 381,548

1 Claim. (Cl. 292—144)

This invention relates to locking devices, and more particularly to a safety lock for automobile doors.

It is an object of this invention to provide a safety lock for the doors of automotive vehicles which is independent of the normal door latching system of the vehicle.

It is a further object of this invention to provide a safety lock for automobile doors which is electrically operated into locked position and electrically operated into unlocked position, but which is maintained in a locked or unlocked position without electrical energization.

It is a still further object of this invention to provide an automobile door safety lock which is simple and reliable in operation.

In accordance with these objectives, this invention provides an electrically operated safety lock for automotive vehicles in which a control switch when turned in one direction causes energization of a solenoid in such manner as to move a plunger member which pushes a bolt into door locking position where the bolt is engaged by a spring-biased latching member. When the control switch is returned to neutral position, the solenoid is deenergized and the plunger returns to a neutral position. However, the bolt is held in locked position by the spring biased latch member and the door remains locked. When it is desired to unlock the door, the control switch is thrown in an opposite direction in such manner as to energize a second solenoid which releases the latch member from engagement with the bolt to permit the bolt to be returned to unlocked position by spring action. Indicating lights are energized through limit switches actuated by the bolt in its locked and unlocked positions in such manner as to indicate when the door is locked and when it is unlocked.

The features of this invention which are believed to be novel are set forth with particularity in the appended claims. The invention, itself, however, both as to its organization and use, together with further objects and advantages thereof, may best be understood by reference to the following description taken in connection with the accompanying drawing, in which:

Figure 1:
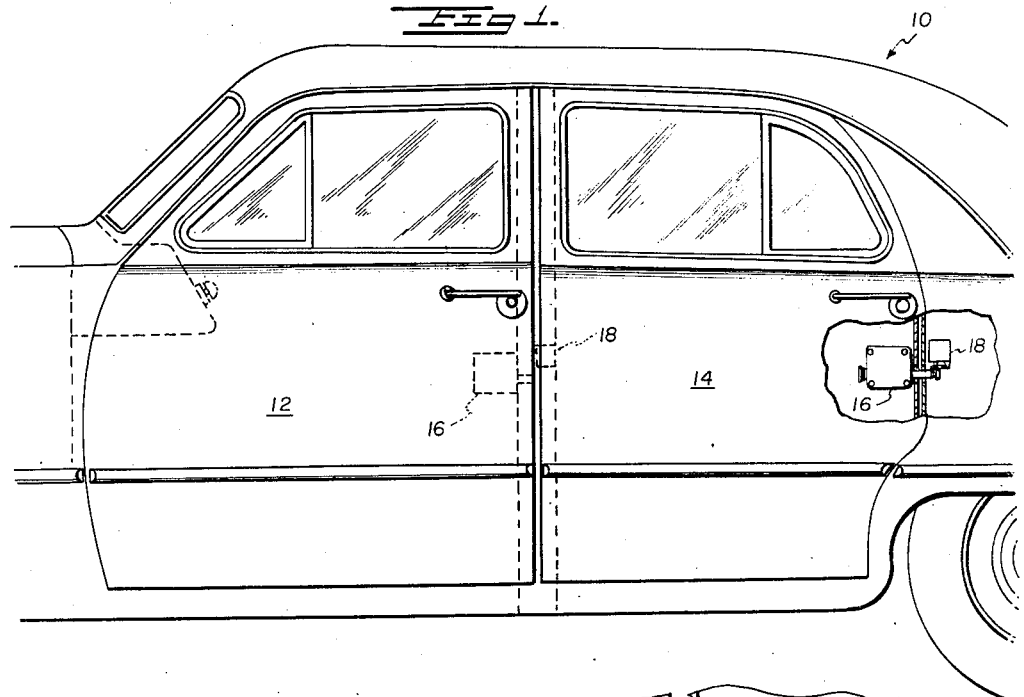
Fig. 1 is a side elevation of an automobile equipped with the electrically operated safety lock of the invention.

Referring now to the drawing, the automobile generally indicated at 10 has a front door 12 and a rear door 14, each of which is hinged at its forward end and latches at its end directed toward the rear of the car. The safety locking device of the invention comprises two assemblies, one of which, indicated at 16 in Fig. 2, comprises a bolt operating mechanism, and the other of which, generally indicated at 18, comprises a bolt latching mechanism. In the view shown in Fig. 1, the bolt operating assembly 16 is housed in the door body 12 at the opening edge of the door, while the bolt latching assembly 18 is housed in the car body channel adjacent the opening edge of the door. Obviously, the arrangement of the assemblies 16 and 18 could be interchanged from that shown in the drawing, so that the latching assembly 18 would be positioned in the door body, while the bolt actuating mechanism 16 would be positioned in the car body channel.

The bolt operating assembly 16 comprises a casing 20 in which are positioned a solenoid 22 operating a horizontally movable plunger member 24 which is normally maintained in the dotted outline position 24' by a biasing spring 26 when the solenoid 22 is not energized. A bolt member 28 normally projects for substantially its entire length into the casing 20, being biased toward the interior of the casing by a spring 30 which bears against shoulder 32 of the bolt member. The bolt 28 is provided at its left-hand end, with respect to the view shown in Fig. 2 with an end portion 34 of reduced diameter which is moved by plunger 24 when solenoid 26 is energized. The bolt 28 is normally biased by spring 30 toward the interior of the casing so that end portion 34 of bolt 28 occupies the dotted outline position 34' when plunger 24 occupies the dotted outline position 24'. A relay 35 housed in casing 20 controls the operation of solenoid 22. Relay 35 comprises a coil 37 which operates a normally open contact 38 to closed position. Energization of solenoid 22, due to energization of relay 35, causes plunger member 24 to be drawn against the biasing pressure of spring 26 from the dotted outline position indicated at 24' to the full line position indicated at 24 in Fig. 2. The end of plunger 24 is pushed against the end 34 of bolt 28 in such manner as to advance bolt 28 through the aperture 39 of the door body 12 and through the aperture 41 of the car body into latching engagement with the latching member of the latching assembly 18.

The bolt latching assembly 18 comprises a casing 40 mounted in the car body channel. Casing 40 houses a vertically mounted solenoid 42 which controls a vertically movable plunger 44. Plunger 44 is normally biased in a downward direction by a spring 54. The lower end of the plunger 44 is pivotally connected at 46 to a slot 48 in a latching arm 50 which is pivotally movable about point 52. The outer end of latching arm 50 is provided with a latching tongue or lip 56 which is engageable with an annular groove 58 at the outer end of bolt 28 to hold bolt 28 in latched position. The casing 40 also houses an electromagnetic relay generally indicated at 55 which controls the energization of unlatching solenoid 42. Relay 55 comprises a coil 56 which operates a normally open contact 56' to closed position. When relay 55 is energized, solenoid 42 is energized and raises plunger 44 against the pressure of spring 54, moving latching arm 50 upwardly about its pivot point 52 and causing lip 56 at the outer end of arm 50 to become disengaged from latching groove 58 at the outer end of bolt 28.

Limit switches 57 and 59 are provided at the two opposite extremes of the travel of the bolt 28. These switches are of the momentary or microswitch type which only remain closed as long as a force or pressure is applied against them. Limit switch 57 is physically actuated by the shoulder 32 of the bolt 28 when the bolt is in retracted position, to thereby energize a warning signal light 60 which may be colored red, for example, to indicate that the electrical safety lock is not in a locked position. Similarly, the outer end of the bolt 28 adjacent the latching groove 58 physically actuates the limit switch 59 when the bolt 28 is in its latched or locked position to thereby energize a signal light 62, which may be colored green, to indicate that the bolt is in a locked position.

Figure 3:
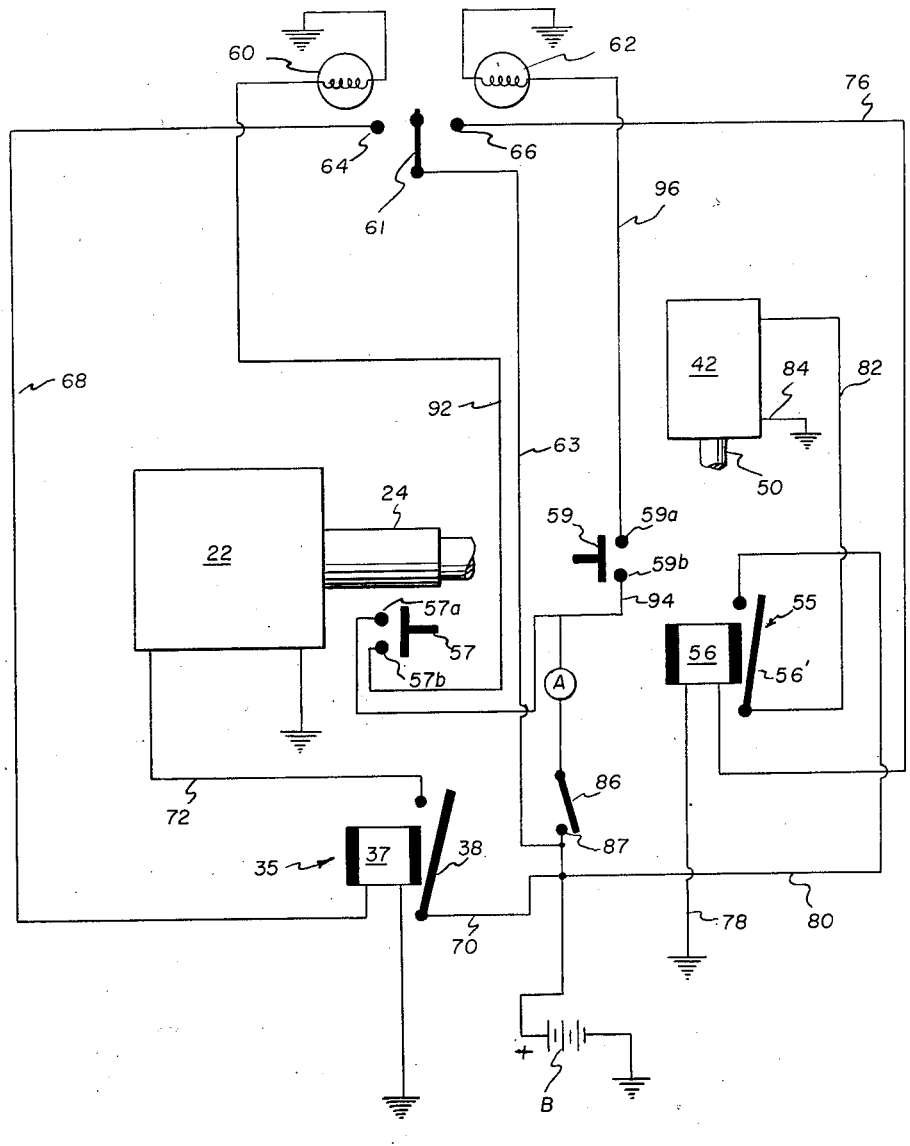
Fig. 3 is a wiring diagram of the electrical circuit of the electrically operated safety lock.

The electrical wiring system for the electrically operated safety lock may best be understood by referring to the wiring diagram of Fig. 3. A two-way control switch 61 controls the locking and unlocking of the bolt 28 as will now be described. The control switch 61 is connected by means of a conductor 63 to the positive terminal of the automobile battery B. Control switch 61 may be thrown into contact with either terminal 64 or terminal 66. When it is desired to actuate the bolt member 28 to locked position, the control switch 61 is thrown to the left, with respect to the view shown in Fig. 3, so as to contact terminal 64. The control switch 61 is of the type which maintains contact with either of the terminals 64 or 66 only as long as the switch is physically held in contacting position. As soon as the closing force is removed from the switch, the switch returns to the neutral position shown in Fig. 3. When switch 61 is thrown into engagement with terminal 64, the coil 37 of relay 35 is energized through the following circuit: from the positive terminal of battery B through conductor 63, through switch 61 to terminal 64, through conductor 68, to the relay coil 37, through relay coil 37 to ground. Relay coil 37 controls a normally open contact 38. Energization of relay coil 37 closes contact 38 and energizes the solenoid 22 through the following circuit: from the positive terminal of the battery through conductor 70, through the closed relay contact 38, through conductor 72 to solenoid 22, through the solenoid 22, through conductor 74 to ground.

Figure 2:
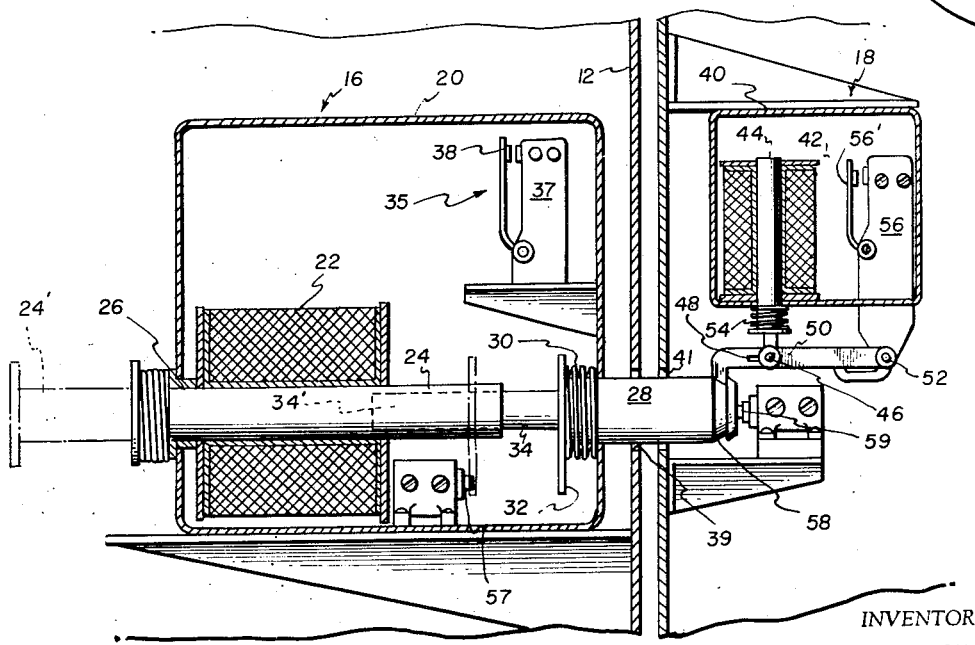
Fig. 2 is an enlarged detailed sectional view of the locking device of the invention.

Energization of solenoid 22 attracts the plunger 24 to the right, with respect to the view shown in Fig. 2, as previously described, and pushes plunger 24 against the head 34 of the bolt 28 in such manner as to push the bolt 28 into locking position where the latching groove 58 is engaged by the lip of the latch arm 50.

As soon as the bolt member 28 has been engaged by the latch arm 50, the control switch 61 may be released to permit the switch to return to neutral position. This causes the coil 37 of relay 35 to become deenergized, thereby causing relay contact 38 to open. The opening of contact 38 deenergizes solenoid 22 and permits the plunger member 24 to return to the dotted outline position 24′ shown in Fig. 2. However, the bolt 28 is maintained in its latched position until the unlatching solenoid 42 is actuated as will now be described.

When it is desired to unlock the door, the control switch 61 is thrown from its neutral position to the right with respect to the view shown in Fig. 3 to engage terminal 66. This causes the circuit of the coil 56 of unlatching relay 55 to be energized in the following manner: from the positive terminal of battery B through conductor 63, through switch 61 to terminal 66, from terminal 66 through conductor 76, to relay coil 56, through relay coil 56, through conductor 78 to ground.

Energization of relay coil 56 moves normally open contact 56′ to closed position to thereby complete the energization circuit of the unlatching solenoid 42, as will now be described. A circuit is completed from the positive terminal of the battery through conductor 80, through the closed contact 56′, through conductor 82 to solenoid 42, through solenoid 42, through conductor 84 to ground. Energization of solenoid 42 attracts the plunger 44 and draws the latching arm 50 upwardly against the force of spring 54. As soon as the lip at the outer end of the latching arm 50 has been raised out of the latching groove 58 of the bolt 28, the biasing spring 30 retracts the bolt 28 out of locking position. As soon as the bolt has been retracted in the manner just described, the operator releases the control switch 61 from engagement with the terminal 66 and permits switch 61 to return to the neutral position shown in Fig. 3.

In order that the operator of the automotive vehicle may know at all times whether or not the safety lock is in locked or unlocked position, the limit switches 57 and 59 are provided to complete a circuit through one or the other of the signal lights 60 or 62. In order that the signal lights will be energized only when the operator is in the vehicle, the energization circuit of each of the respective lights 60 and 62 is completed through the ignition switch 86 of the vehicle. When the bolt 28 is in an unlocked position, the shoulder 32 physically closes the limit switch 57 in such manner as to bridge the terminals 57a and 57b. This completes the following circuit, assuming that the ignition switch 86 is in closed position: from the positive terminal of the battery to terminal 87 of ignition switch 86, through the ignition switch 86, through the ammeter A, through conductor 94 to terminal 57b, through switch 57, to terminal 57a, through conductor 92 to light 60 and thence to ground. The light 60 may be colored red, for example, to serve as a warning that the safety lock is not in locked position.

When the bolt 28 is in locked position, as shown in Fig. 2, it physically closes the limit switch 59 in such manner as to bridge the terminals 59a and 59b of the limit switch 59. This completes the circuit through the signal light 62, as follows: from the positive terminal of the battery to terminal 87 of ignition switch 86, through the ignition switch 86, through ammeter A, through conductor 94, to terminal 59b of the limit switch 59, through switch 59 to terminal 59a, through conductor 96 to the light 62 and then to ground. The light 62 may be colored green, for example, to indicate that the bolt 28 is in locked position.

It will be noted that although the warning lights 60 and 62 are not energized unless the ignition switch 86 is turned on, the electrical system which actuates the locking and unlocking of bolt 28 is independent of the opening or closing of the ignition switch 86.

If two or more locks are used on the automotive vehicle, the bolt operating solenoids 22 for the respective locks should be electrically connected in parallel with each other under the control of a single relay 35. Similarly, the unlatching solenoids 42 for the respective locks should all be connected in parallel with each other under control of a single relay 55. However, the limit switches 57 which indicate an "unlocked" position of the respective locks should be connected in series with each other and with a single indicator lamp 60. Similarly, the limit switches 59 which indicate a "locked" position of the respective locks should be connected in series with each other and a single indicator lamp 62. This arrangement will cause non-operation of one of the signal lights due to failure of anyone of the locks to lock or unlock properly thereby warning the operator of the vehicle that something is wrong.

It can be seen from the foregoing that there is provided in accordance with this invention a safety locking device for the doors of automotive vehicles which is simple and reliable in operation. Furthermore, the locking device does not serve as a drain upon the battery of the automotive vehicle since electrical energy is used only during the actual latching and unlatching operations and is not required to maintain the locking member in locked or unlocked position.

While there has been shown and described a particular embodiment of the invention, it will be obvious to those skilled in the art that various changes and modifications can be made therein without departing from the invention, and therefore, it is aimed in the appended claim to cover all such changes and modifications as fall within the true spirit and scope of the invention.

Having thus set forth and disclosed the nature of this invention, what is claimed is:

In a safety lock for automotive vehicles, an assembly receivable within the door of the vehicle adjacent the opening edge thereof, said assembly comprising an extensible locking member adapted for telescopic reception in a keeper in the body of said vehicle, said locking member having a projection fixed thereto, a plunger engaging said locking member providing a lost motion connection between said plunger and said locking member, a plurality of spring means manually biasing said plunger and said locking means toward retracted position, a solenoid adapted for association with a source of electrical energy for surrounding said plunger for extending said plunger and said locking member upon energization of said solenoid, a relay for controlling energization of said solenoid, two oppositely disposed limit switches at the opposite ends of travel of the locking member, one adapted to be engaged by said locking member when in extended position and the other adapted to be engaged by said projection on said locking member when in retracted position, a manually operable control switch, and electrical connections between said solenoid, said relay, said limit switches and said control switch.

References Cited in the file of this patent

UNITED STATES PATENTS

| | | |
|---|---|---|
| 1,262,435 | Berg | Apr. 9, 1918 |
| 1,274,381 | Brooks | Aug. 6, 1918 |
| 2,160,011 | Beck | May 30, 1939 |
| 2,276,019 | Ching | Mar. 10, 1942 |
| 2,499,727 | Craig | Mar. 7, 1950 |
| 2,519,197 | Preston | Aug. 15, 1950 |